Aug. 28, 1923.

C. LATTA 1,465,944

FRAME FOR SUPPORTING VEHICLE LICENSE PLATES

Filed Oct. 30, 1922

Inventor:
Charles Latta,
by Rippey Kingsland,
His Attorneys.

Patented Aug. 28, 1923.

1,465,944

UNITED STATES PATENT OFFICE.

CHARLES LATTA, OF ST. LOUIS, MISSOURI, ASSIGNOR, BY DIRECT AND MESNE ASSIGNMENTS, TO JOHN BUM, OF ST. LOUIS, MISSOURI.

FRAME FOR SUPPORTING VEHICLE LICENSE PLATES.

Application filed October 30, 1922. Serial No. 597,843.

*To all whom it may concern:*

Be it known that I, CHARLES LATTA, a citizen of the United States, residing at St. Louis, Missouri, have invented a new and useful Frame for Supporting Vehicle License Plates, of which the following is a specification.

This invention relates to frames for supporting vehicle license plates.

An object of the invention is to provide an improved frame for supporting a vehicle license plate and means for supporting the frame in connection with the vehicle.

Another object of the invention is to provide a device embodying the subject-matter last above stated, in combination with a cooperative device for holding the license plate in position in the frame.

In the drawings, Fig. 1 is a front elevation of a frame for supporting a circular license plate.

Figure 1:
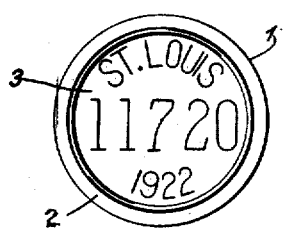
Figure 2:
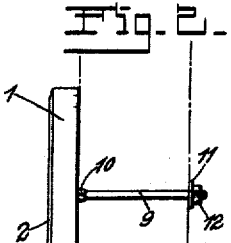
Fig. 2 is a side elevation.
Figure 3:
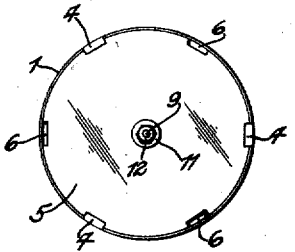
Fig. 3 is a rear elevation.
Figure 4:
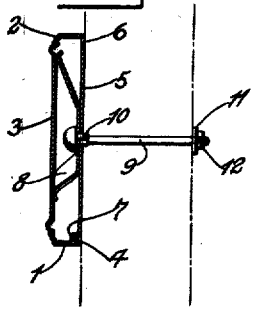
Fig. 4 is a vertical sectional view.
Figure 5:
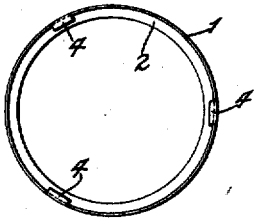
Fig. 5 is a rear elevation of the front portion of the frame.
Figure 6:
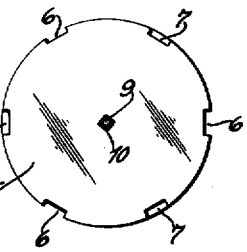
Fig. 6 is a rear elevation of the rear portion of the frame disconnected from the front portion.
Figure 7:
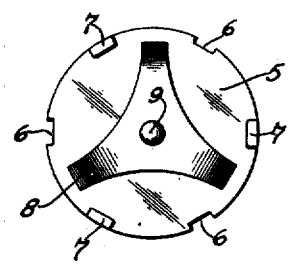
Fig. 7 is a view showing the inside or front of the rear portion of the frame.

The frame shown in Figs. 1 to 7 inclusive is designed and adapted to support a circular license plate and comprises an annular frame member 1 having an inwardly turned flange 2 at its front end adapted to engage the edge of a circular license plate 3. The rear end of the frame or ring 1 is cut or split in a number of places to provide a number of inwardly extending radial tongues 4.

The other portion of the frame in the embodiment shown in Figs. 1 to 7 comprises a disc or circular plate 5 insertable within and withdrawable from the ring frame 1 and having a number of notches 6 in its edge through which the projections 4 pass when the plate 5 is inserted in or withdrawn or removed from the ring 1. The disc 5 is provided with a number of inwardly offset notches or recesses 7 adapted to receive the projections 4. It is obvious that the disc 5 may be placed within the ring 1 by passing the projections 4 through the notches 6; and that the disc 5 may then be turned to position to engage the projections 4 within the notches or recesses 7.

The multiramose spring 8 is attached to the inner side of the disc 5, the arms of said spring being arranged to engage the license plate 3 and press it against the flange 2 with sufficient pressure to prevent the license plate from rattling. A bolt 9 has a polygonal portion 10 at the head thereof. The bolt 9 passes through the spring 8 and the disc 5, the polygonal portion 10 of the bolt being received within a polygonal recess in said spring and disc. This prevents the parts from turning relatively. The bolt 9 is of sufficient length and of proper size to extend between the tubes or cells of the radiator of a motor vehicle, so as to support the license plate in front of the radiator. The bolt is equipped with a proper washer 11 and nut 12.

Figure 8:
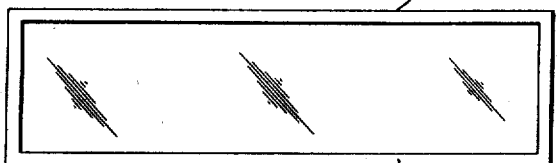
Fig. 8 is a front elevation of the frame for supporting a rectangular license plate.
Figure 10:
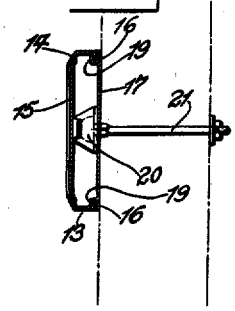
Fig. 10 is a cross sectional view on the line 10—10 of Fig. 9.
Figure 9:
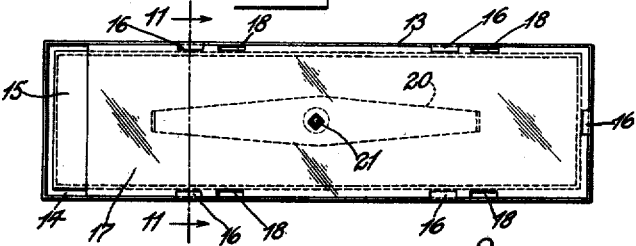
Fig. 9 is a rear elevation.

In the embodiment of the invention shown in Figs. 8 to 10, the frame is also composed of two parts of which the part 13 is rectangular and performs the same function in the case of a rectangular license plate as does the frame 1 in the case of a circular license plate. The front end of the frame 13 is formed with an in-turned flange 14 which forms a seat for the rectangular license plate 15 within the frame. The side walls of the frame 13 are provided with a number of inwardly extending fingers 16 corresponding to the projections 4. The rear part of the frame comprises a rectangular plate 17 which is of shorter length than the frame 13 and which has a number of notches 18 in its edges to receive the projections 16. The plate 17 is also formed with a number of inset seats or recesses 19 to receive the arms 16.

By reference to Fig. 9 it will be seen that the plate 17 may be placed within the frame 13 by passing the arms 16 through the notches 18, and that the plate 17 may then be moved in the proper direction to engage the arms 16 in the notches or seats 19. A leaf spring 20 is held in connection with the plate 18 by a bolt 21 in the same way that the spring 8 is held by the bolt 9 and performs a similar function to the spring 8.

From the foregoing it will be seen that I have provided a highly convenient and efficient device for holding a license plate in connection with the radiator of a motor vehicle, and that the license plate may be easily removed from year to year to receive the new plates that are required. The specific construction and arrangement may be varied without departure from the principle of the invention, and I do not restrict myself, unessentially, but what I claim and desire to secure by Letters Patent is:—

1. A device for supporting a license plate, comprising a frame for receiving the plate and holding the plate from vertical movement and from lateral movement in any direction, a flange at one end of said frame adapted to engage the outer sides of the edges of the license plate, a plate removably mounted in the end of the frame opposite from said flange, and a device within said frame for pressing the license plate against said flange and for pressing the last-named plate in a direction away from the license plate.

2. A device of the character described, comprising a frame, a flange on the inside of the frame, projections on the inside of the frame, a plate engaging and held within the frame by said projections, a spring in connection with the inner side of said plate, and a bolt passing through said plate for supporting said device.

3. A device of the character described, comprising a frame, means in connection with said frame for engaging a license plate, a removable rear end plate in said frame, a spring supported by said removable end plate within said frame for pressing said license plate against said means, and a device extending through said rear end plate for supporting the frame and holding said spring in position.

4. A device of the character described, comprising a frame, a flange in said frame for engaging a license plate, a plate removably mounted in the frame, means for holding the plate within the frame, a spring in connection with the plate for pressing the license plate against said means, and a device for supporting the frame.

5. A device of the character described, comprising a frame, an inturned flange at one end of the frame, inturned fingers at the opposite end of the frame, a plate within the frame engaging said fingers, a spring in connection with said plate extending toward the opposite end of the frame, and a bolt passing through said spring and said plate arranged to hold said parts together and to support the frame.

6. A device of the character described, comprising a frame, means in connection with one end of said frame for engaging a license plate, a removable end plate in the opposite end of said frame, a spring within said frame pressing said license plate against said means and pressing said end plate in a direction away from the license plate, and means for holding said spring in proper position in said frame and for supporting said frame.

CHARLES LATTA.